United States Patent
Lampert et al.

(10) Patent No.: US 6,705,765 B2
(45) Date of Patent: Mar. 16, 2004

(54) POLARIZATION MAINTAINING OPTICAL FIBER CONNECTOR PLUG

(75) Inventors: Norman R. Lampert, Norcross, GA (US); Yu Lu, Norcross, GA (US); Naif T. Subh, Lawrenceville, GA (US); Ian A. White, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/151,613

(22) Filed: May 20, 2002

(65) Prior Publication Data

US 2003/0215190 A1 Nov. 20, 2003

(51) Int. Cl.[7] ................................................. G02B 6/36
(52) U.S. Cl. .......................................................... 385/77
(58) Field of Search ............................. 385/77, 78, 80; 439/354

(56) References Cited

U.S. PATENT DOCUMENTS 5,672,071 A  * 9/1997  Ceru ........................... 439/353
6,364,685 B1 * 4/2002  Manning ..................... 439/357

* cited by examiner

Primary Examiner—Tulsidas Patel
Assistant Examiner—Phuong Dinh
(74) Attorney, Agent, or Firm—Thomas, Kayden, Horstemeyer & Risley, LLP

(57) ABSTRACT

A connector plug for an optical fiber polarization maintaining connector has a front housing portion from which extends a cantilevered latching arm having a cross-sectional shape of a truncated wedge, and a rear housing portion. A barrel assembly having a flange thereon and a ferrule extending therefrom is housed within said first and second portions and is incrementally rotatable with respect to the first portion of the housing and hence to the latching arm. In a first embodiment the flange is seated in the front portion and prevented from turning with respect thereto. In a second embodiment the rear housing portion is an extender cap having resilient clamping arms which grip the flange. The extender cap is incrementally rotatable with respect to the first portion of the housing and, hence, the ferrule is incrementally rotatable with respect to the latching arm.

21 Claims, 14 Drawing Sheets

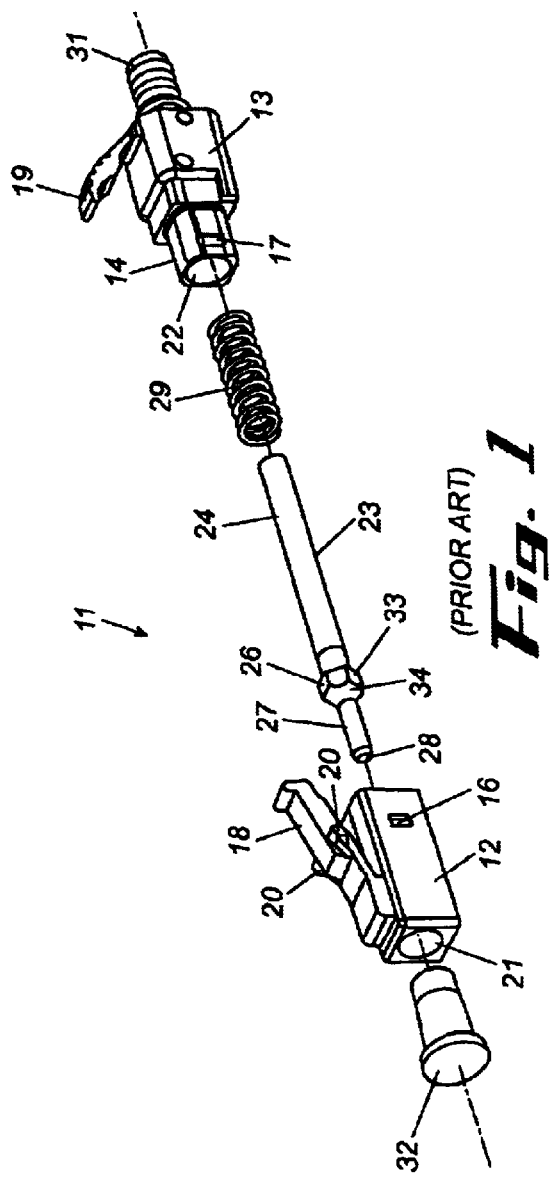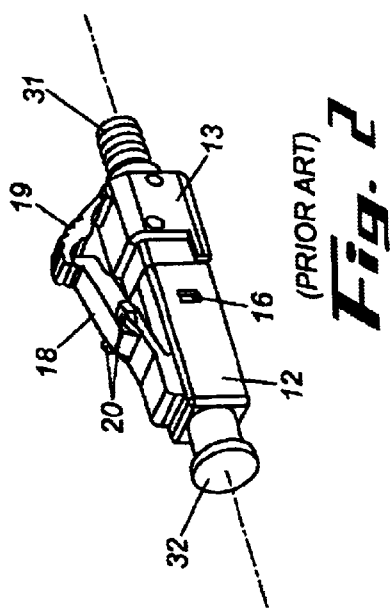

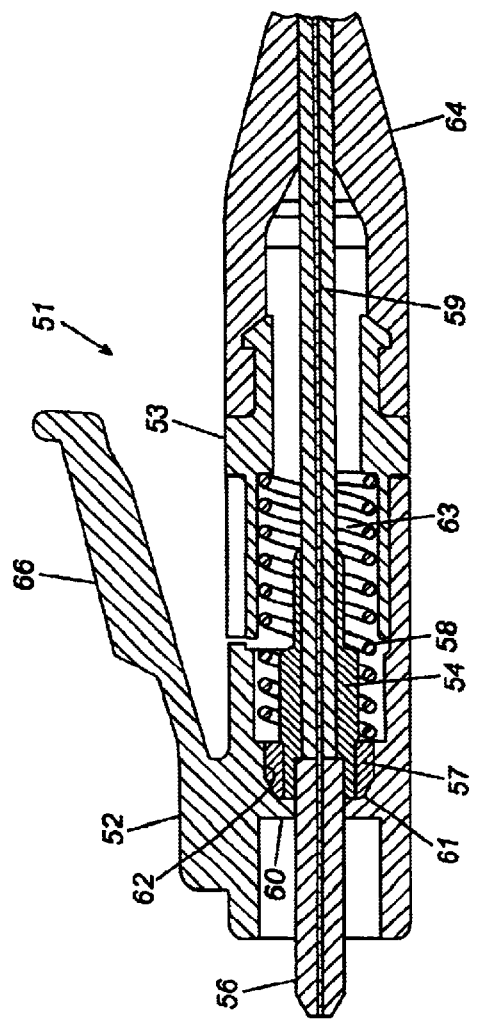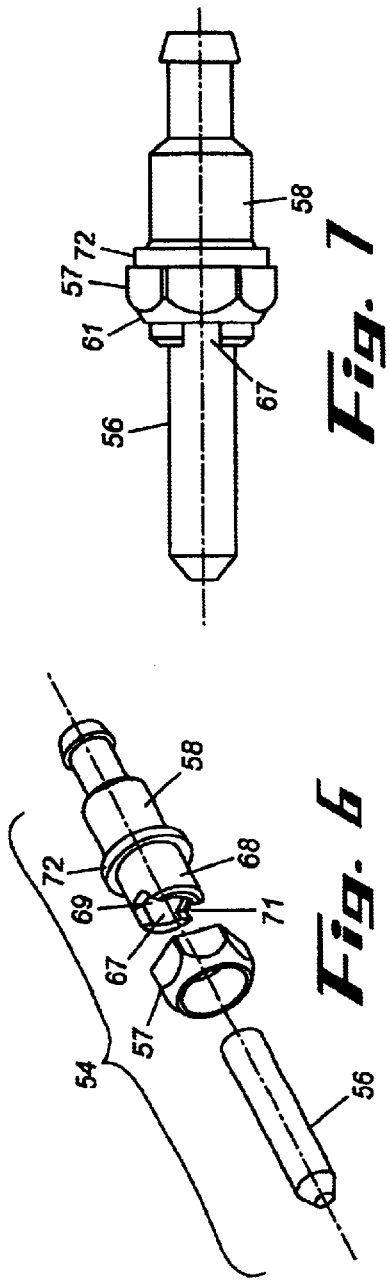

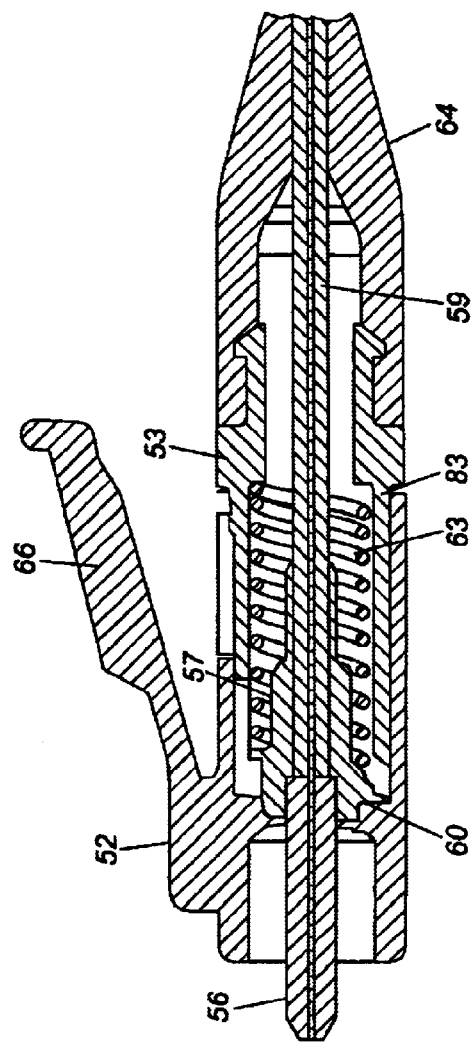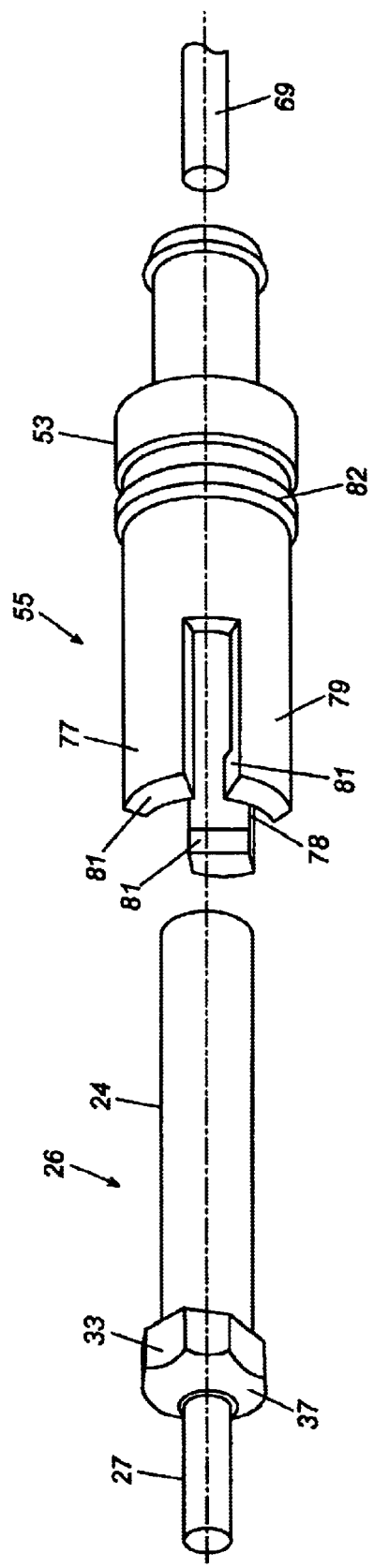

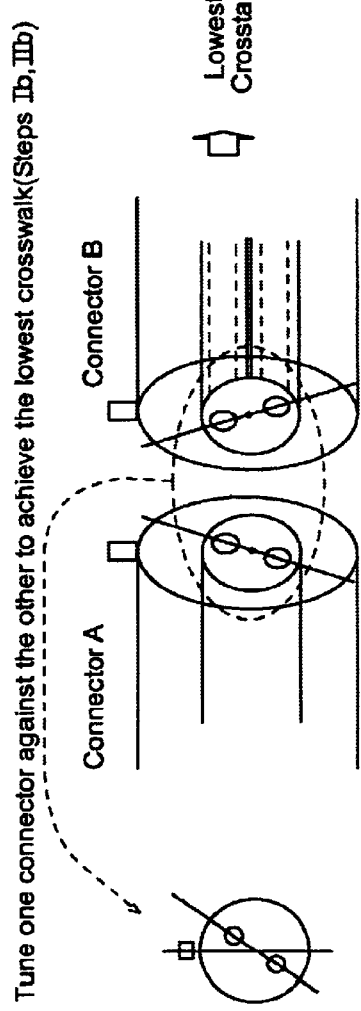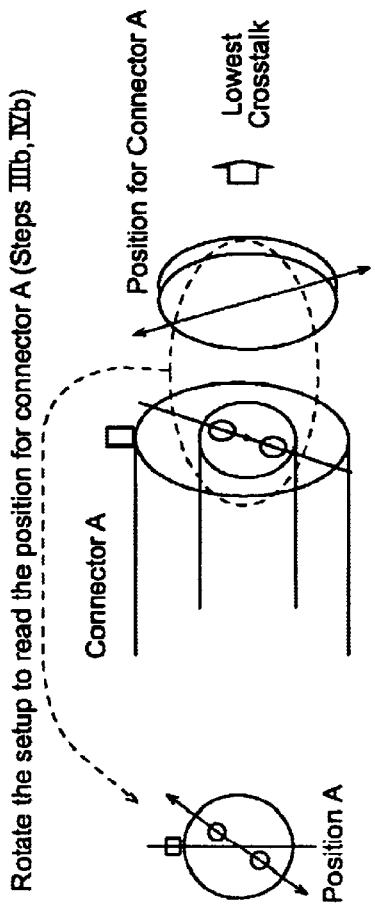

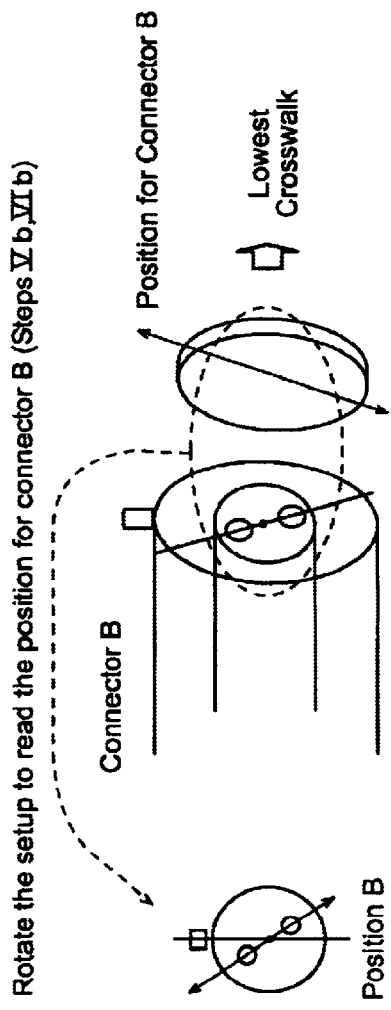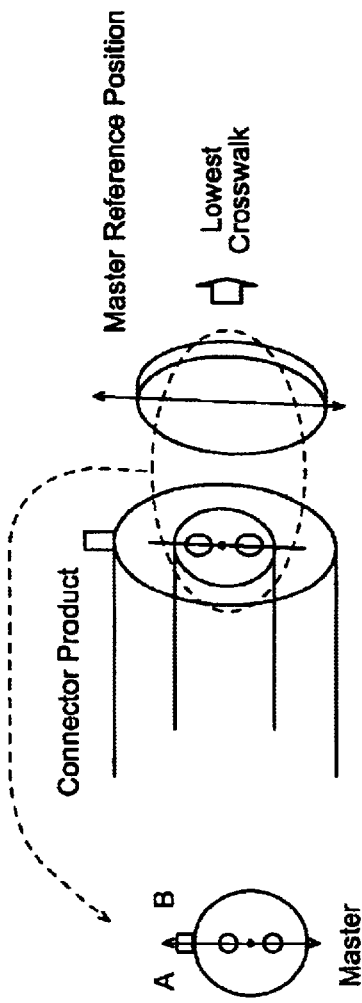

# POLARIZATION MAINTAINING OPTICAL FIBER CONNECTOR PLUG

RELATED APPLICATIONS

This application is related to U.S. patent application Ser. No. 09/811,074 filed Mar. 16, 2001 the disclosure of which is incorporated herein by reference, and to U.S. patent application Ser. Nos. 10/151,450 and 10/151,130 filed concurrently herewith.

FIELD OF THE INVENTION

This invention relates to a connector plug for terminating polarization maintaining (PM) optical fibers.

BACKGROUND OF THE INVENTION

In optical fiber communications, connectors for joining fiber segments at their ends, or for connecting optical fiber cables to active or passive devices, are an essential component of virtually any optical fiber system. The connector or connectors, in joining fiber ends, for example, has, as its primary function, the maintenance of the ends in a butting relationship such that the core of one of the fibers is axially aligned with the core of the other fiber so as to maximize light transmissions from one fiber to the other, or, put another way, to reduce insertion loss. Another goal is to minimize back reflections. Alignment of these small diameter fibers is extremely difficult to achieve, which is understandable when it is recognized that the mode field diameter MFR of, for example, a singlemode fiber is approximately nine (9) microns (0.009 mm). The MFR is slightly larger than the core diameter. Good alignment (low insertion loss) of the fiber ends is a function of the transverse offset, angular alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects.

In the present day state of the art, there are numerous, different, connector designs in use for achieving low insertion loss and stability. In most of these designs, a pair of ferrules (one in each connector), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment, some misalignment being acceptable.

However, in connecting or terminating polarization maintaining (PM) fibers, such is not the case. Many optical fiber components, such as, for example, interferometers and sensors, lasers, and electro-optic modulators, are extremely sensitive to and dependent upon, for proper operation, the polarization of the light. Even very slight alterations or changes in the light polarization orientation can result in wide swings in the accuracy of response of such devices. PM fiber has polarization-dependent refractive indices, and the speed of light in an optical fiber is inversely proportional to the magnitude of the refractive index. A birefringent optical fiber is one having two polarizations having different velocities of propagation, thus giving rise to a "fast" wave and a "slow" wave. In a PM fiber, the polarization of a linearly polarized light wave input to the fiber, with the direction of polarization parallel to that of the one of the two principal polarizations, will remain or be maintained in that polarization as it propagates along the fiber, hence the term "polarization maintaining." If the polarization of the light wave is to be maintained at a splice or other connection, the principal axes of birefringence of the two joined fibers must be aligned in parallel, otherwise there will be polarization cross-coupling, i.e., crosstalk, which is highly undesirable. Thus, where two PM fibers, for example, are to be connected together, they should be terminated carefully to reduce the crosstalk during the connectorization process. Also, the connectors must be capable of aligning then maintaining the fiber orientation to the connector key position. Connectors with tolerances adequate for connecting non-PM fibers usually are inadequate for maintaining polarization alignment at the connector junction.

Typical PM connector requirements are an insertion loss of less than 0.3 dB, and the prior art PM connector arrangements comprise numerous, different connector configurations aimed at meeting these requirements for different connectors, such as an SC type connector as shown in U.S. Pat. No. 5,216,733 of Ryo Nagase et al. The connector of that patent comprises a ferrule body and a ring shaped flange having a keyway mounted on the periphery of the ferrule body. Alignment is achieved by rotating the ferrule body with respect to the flange keyway. The combination of ferrule and flange comprises a plug which is inserted into a push-pull SC connector having a key therein for mating with the flange keyway and springs bias the flange in the longitudinal direction to maintain the alignment.

In U.S. Pat. No. 4,784,458 of Horowitz, a splice joint for PM fibers is shown wherein aligned fibers are joined with UV curing epoxy, and the joint is overlaid with epoxy cement for rigidity. Such ajoint is permanent, and does not function as a connect-disconnect optical fiber connector.

U.S. Pat. No. 5,561,726 of Yao discloses an apparatus for controlling the polarization state of the light within a fiber by squeezing a portion of the fiber to produce a birefringent fiber, and the squeezer is then rotated to change the polarization of the light within the fiber. The device is not a connector, but is intended for use with polarization sensitive devices such as interferometers and electro-optic modulators, however, it may also be used with connectors for connecting two PM fibers.

It is common practice in the prior art for creating PM fibers to include a pair of rods in the fiber cladding which extend parallel to the core as shown in U.S. Pat. No. 4,515,436 of Howard et al. Such rods, which are preferably of glass, are, in manufacture of the fiber, included in the fiber preform from which the fiber is drawn. As the fiber is drawn, the rods are accordingly diminished in diameter and are located within the cladding, preferably on either side of the core. The rods have different thermal expansion characteristics than the surrounding glass, and the stress they exert on the core causes the index of refraction to change along that axis. The axes then have different indices of refraction value and thus propagate light at different speeds. Variations on the two rod arrangement are also known, such as the elliptical stress member disclosed in U.S. Pat. No. 5,488,683 of Michal et al. Also, squeezing the fiber to create birefringence, as shown in the aforementioned Yao patent is feasible. The two rod PM fiber, so called "Panda" type PM fiber, however, has proven quite satisfactory in use, and it is toward the connectorization of such a fiber that the present invention is directed, although other types of PM fibers may be used with the present invention.

SUMMARY OF THE INVENTION

In the copending U.S. patent application Ser. Nos. 10/151,450 and 10/151,130 are shown, respectively, an apparatus and methods of tuning a PM connector plug and an adapter for the connector plug of the present invention the principles of which are applicable to any of a large number of optical fiber connectors, but are embodied in a modified LC connector in those applications. For optimum performance, i.e., maximum transmission of a polarized beam, it is highly desirable to provide accurate rotational positioning of better than ±1° or even as accurate as <¼° between connectors equipped with polarization maintaining fibers.

The present invention is a connector plug for PM connectors which is intended for use with the adapter and tuning method of those Lampert et al. applications to achieve this desideratum. When a PM jumper cable, for example, is terminated by connectors, it is most desirable that the cable/connector combination be tuned to align the fiber slow axis with a reference point such as the connector key which may be the connector latching arm. In accordance with the present invention, there is provided a connector plug which is tunable to yield extremely accurate rotational positioning of the connector ferrules, or, more specifically, the fibers contained therein.

The connector plug of the invention comprises in a first embodiment, a tunable barrel assembly as shown in U.S. Pat. No. 5,481,634 of Anderson et al., the disclosure of which is incorporated by reference herein, a connector plug that includes the barrel-ferrule assembly for holding the end of an optical fiber extending axially therethrough and a housing for the assembly. A coil spring member contained within the housing surrounds the barrel, which is of tubular configuration, and bears against an interior wall of the housing and an enlarged flange member on the barrel, thereby supplying forward bias to the barrel-ferrule assembly relative to the housing. As is shown in the aforementioned U.S. patent applications, the barrel-ferrule assembly has an enlarged flange member which is hexagonal 1 in shape and has a tapered or chamfered leading surface that may be slotted. The housing, in turn, has a hexagonally shaped cavity, which provides any of six rotational positions for the flange and a tapered seating surface for the tapered surface of the flange. The dimensions of the cavity are such that the hexagonal barrel flange floats within the hexagonal cavity, in the Anderson et al. arrangement and can rotate about ±12°, which diminishes the tuning accuracy. In the PM connector of the Lampert et al. application Ser. No. 09/811074, this float is greatly reduced by dimensioning the hexagonal barrel flange, or nut, so that it is a virtual slip fit within the hexagonal cavity. Additionally, the flange is affixed to the barrel, hence, the barrel has only six positions, which are subject to the diminished float.

In the aforementioned U.S. patent application Ser. No. 09/811074, of Lampert et al, there is also shown a tunable nut arrangement wherein a hexagonal nut is a "light" press fit on the ferrule containing tubular portion of the barrel assembly, so that the nut may be rotated relative to the ferrule in extremely small increments, such as fractions of a degree. In the arrangement of that application, the nut may remain seated in the hexagonal seat in the connector plug body, and the ferrule rotated with respect thereto. As explained in that application, the "light" press fit is sufficient to prevent accidental or unwanted relative rotation after tuning. After tuning the nut (or flange) may be cemented in place. Such an arrangement is thus capable of producing the small increments of relative rotation that may be required for optimum PM tuning, and is a preferred arrangement for the first embodiment of the invention.

In accordance with the present invention, the latch of the plug, which includes a latching arm having latching shoulders on either side, preferably is of plastic material and has tapered sides, thereby imparting to the arm a cross-section shaped as a truncated wedge. The latching shoulders may also have tapered sides so that both the arm and the shoulders, alone or together have a taper. The adapter for use with the invention has a longitudinal slot therein which has sloping sides for receiving the tapered latching arm as shown in application Ser. No. 10/151,130. As is the practice with the latching arm, it is sufficiently resilient or elastic to snap into the slot once the latching lugs are engaged. In prior art arms and slot arrangements the slots and the arm both have straight sides, hence the arm is made slightly narrower than the slot to insure engagement, which gives rise to some play between the plug and the adapter which can alter the position of the polarization vector. The tapered arm and slot of the invention create a tight fit and eliminate such play so that the plug is firmly held in its latched position. In addition, the tapered engagement centers the plug relative to the adapter so that the ferrule/barrel assembly is properly aligned within the adapter.

Further in accordance with a second embodiment of the invention, the plug body has a rotatable extender cap therein which has longitudinally extending resilient arms, the distal ends of which bear against the hexagonal portion of the barrel assembly as a three jawed collet further to ensure alignment of the barrel and to eliminate virtually any float thereof. The barrel of the connector plug is an assembly comprising a tubular member which may have a notched end for tuning and an enlarged hexagonal nut affixed thereto on the outer surface of the tubular member and which has a tapered front section which finctions as a guide in conjunction with a tapered recess in the housing. As described hereinbefore, such an assembly is shown and described in the U.S. patent application Ser. No. 09/811074, the disclosure of which is incorporated herein by reference. Tuning of the connector is achieved by rotation of the extender cap which firmly holds the nut on the barrel. Hexagonal seat in the plug body is illuminated, and hence, the ferrule contained in the barrel can be incrementally rotated to produce, where necessary, incremental changes in the angular orientation.

In both embodiments of the invention, the latching arm has a tapered cross section as described hereinbefore, and the fitting of the parts to each other approaches a slip fit, so that float is minimized.

DESCRIPTION OF THE DRAWINGS

FIG. 2 is a perspective view of the plug of FIG. 1 as assembled;

FIG. 5 is a cross-sectional view of the plug of the previous figures as assembled and terminating an optical fiber;

FIG. 6 is an exploded view of an alternative form of tunable barrel member for a connector plug;

FIG. 7 is a side elevation view of the assembled barrel member of FIG. 6;

FIG. 11 is a cross-sectional elevation view of one embodiment of the PM plug terminating an optical fiber;

FIG. 12 is a perspective view of another embodiment of the PM plug;

FIG. 18 is a diagram of the apparatus for tuning an optical fiber jumper;

FIGS. 24 through 27 are diagrams illustrating the several steps in establishing the master reference position.

DETAILED DESCRIPTION

Figure 1B:
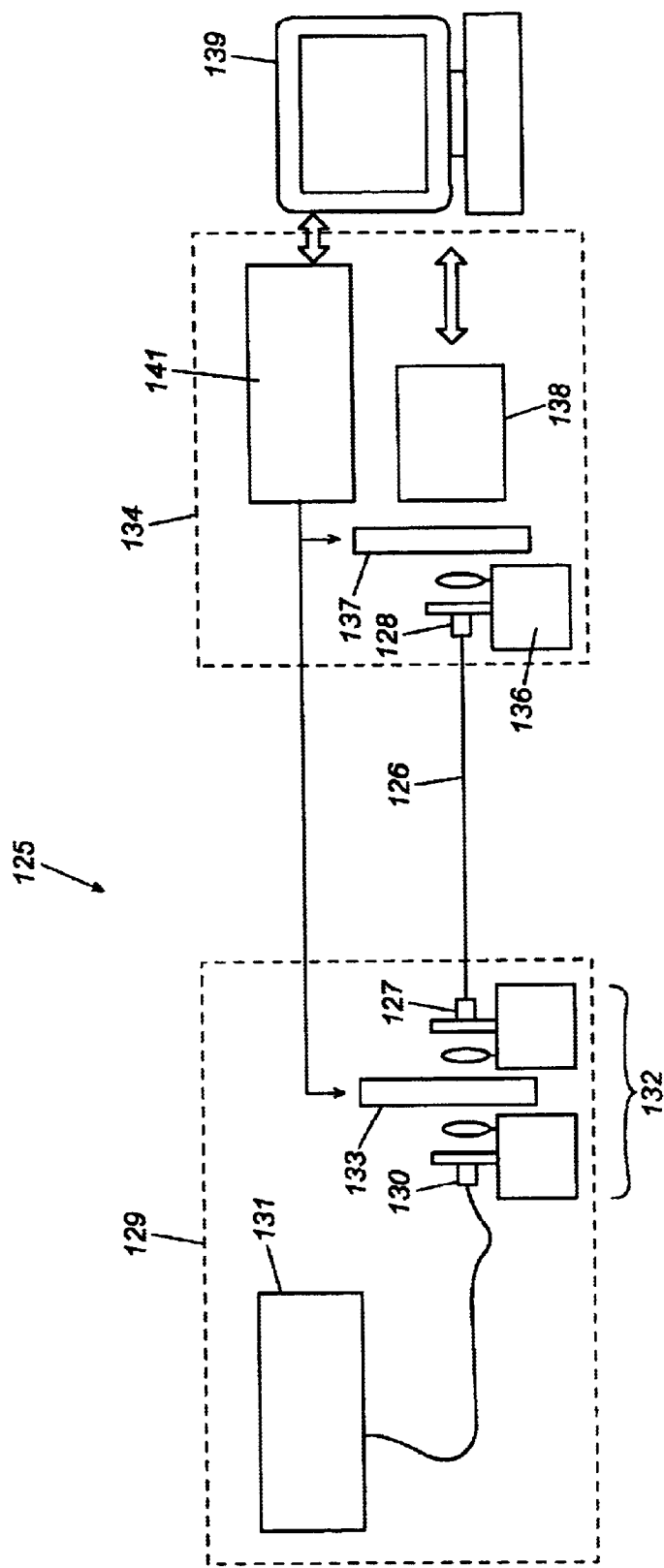
FIG. 1 is an exploded perspective view of a prior art LC type connector plug.

FIG. 1 is an exploded perspective view of the principal components of an LC type connector 11 as disclosed in the aforementioned US patent applications and U.S. Pat. No. 6,155,146. It is to be understood that the principles of the present invention are also applicable to other types of connectors, such as an ST, SC, or other amenable to modification to incorporate these principles. Connector 11 comprise a plug housing formed of a front section 12 and a rear section 13 having an extended portion 14 which fits into section 12 and latches thereto by means of slots 16—16 in front section 12 and latching members 17—17. Members 12 and 13 are preferably made of a suitable plastic material. Front section 12 has a resilient latching arm 18, having latching shoulders 20, extending therefrom for latching the connector 11 in place in a receptacle or adapter. The arm 18 and shoulders 20 together define a latch. Rear or section 13 has extending therefrom a resilient arm or trigger 19, the distal end of which, when the two sections 12 and 13 are assembled, overlies the distal end of arm 18 to protect it from snagging and to prevent nearby cables from becoming entangled. Usually latch arm 18 and guard 19 are molded with their respective housing sections 12 and 13, respectively, and form "living hinges" therewith, which enable them to be moved up and down between latching and unlatching positions. Front section 12 has a bore 21 extending therethrough which, when the parts are assembled, is axially aligned with a bore 22 extending through rear sections 13. The bores 21 and 22 accommodate a barrel assembly 23 which comprises a hollow tubular member 24 having a bore 25 extending therethrough and having a ferrule holding apparatus shown here as an enlarged flange or barrel member 26 from which extends a ferrule 27 which may be made of a suitably hard material such as, preferably, ceramic, glass, filled-plastic, or metal. Ferrule 27 has a bore 28 extending therethrough for receiving and holding an optical fiber therein. When the connector 11 is assembled, a coil spring 29 surrounds the tubular portion 24 of the assembly 23, with one end bearing against the rear surface of flange 26 and the other end bearing against an interior shoulder in rear section 13, as will best be seen in subsequent figures.

In practice, the uncoated portion of the optical fiber is inserted into bore 28 of ferrule 27 and adhesively attached thereto. Spring 29 is compressed as the sections 12 and 13 are connected and supplies a forward bias against the rear of flange 26 and, hence, to ferrule 27. This arrangement of ferrule 27 and spring 29 is considered to be a "floating" design. Prior to connection, the spring 29 causes ferrule 27 to overtravel its ultimate connected position. When connector 11 is connected within a suitable adapter and the distal end of ferrule 27 butts against the corresponding ferrule end of another connector or of other apparatus, spring 29 will be compressed, thereby allowing backward movement of ferrule 27 to where its end, and the end of the abutting ferrule, lie in the optical plane (transverse centerline) between the two connectors.

The rear end of rear section 13 has a ridged member 31 extending therefrom for attachment of optical fiber cable and a strain relief boot, not shown. For protection of the distal end of ferrule 27 during handling and shipping, a protective plug 32, sized to fit within bore 21, is provided. FIG. 2 depicts the assembled connector 11 in its shipping or handling configuration.

Figure 3A:
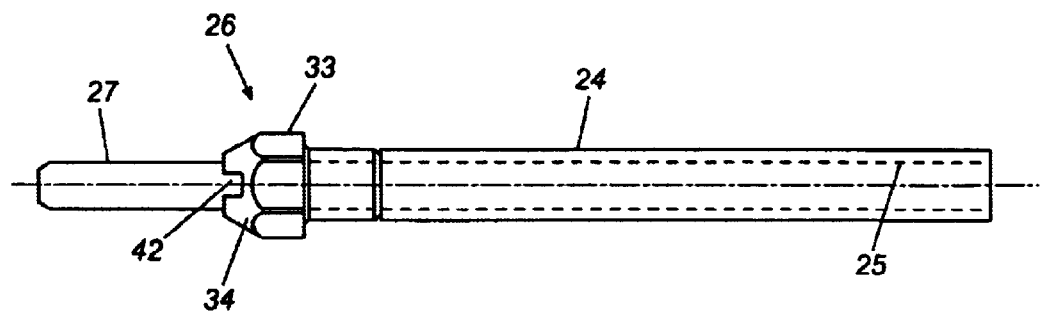
FIG. 3a is a view of the flanged barrel member of the plug of FIG. 1.
Figure 3B:
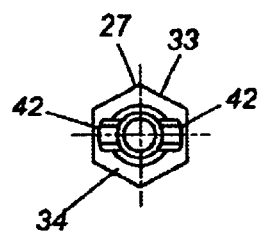
FIG. 3b is an end view of the barrel member of FIG. 3.
Figure 4A:
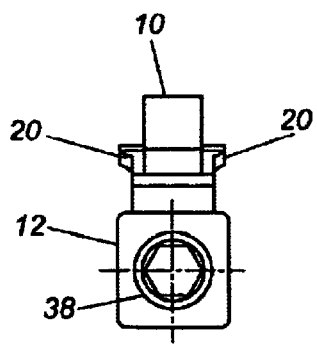
FIG. 4a is an end view of the plug of FIGS. 1 and 2.
Figure 4B:
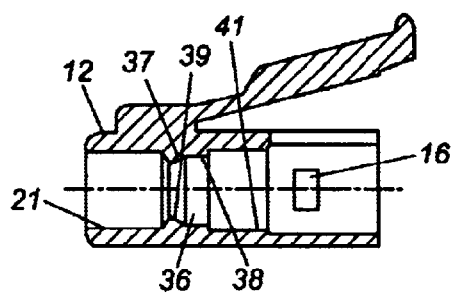
FIG. 4b is a cross-sectional view of a portion of the housing of the plug of FIG. 4A.

As best seen in FIGS. 3a and 3b, flange 26 has a hexagonally shaped portion 33 and a front tapered portion 34 with tuning notches 35, as shown in U.S. Pat. No. 6,155,146, which can be a tapered extension of the hexagonal portion. While the following discussion relates to a multi-faceted ferrule holding member, it is to be understood that the term "faceted" is intended to include other locating arrangements such as, for example, slots or splines, such as are shown in, for example, the U.S. Pat. No. 6,155,146 patent. As shown in FIGS. 4a and 4b, front section 12 has a flange seating cavity 36 formed in a transverse wall 37 thereof which has a hexagonally shaped portion 38 and a tapered portion 39 dimensioned to receive and seat surface 34 of flange 26. That portion 41 of bore 21 immediately to the rear of portion 38 has a diameter sufficient to allow rotation of flange 26 when it is pushed to the rear against spring 29 and disengaged from the cavity 36. Thus, as will be discussed more fully hereinafter, when flange 26 is pushed to the rear it may be rotated and, when released, re-seated by spring 29 with tapered portion 34 acting as a guide and centering arrangement. The hexagonal configuration makes it possible to seat the flange 26 in any of six angular rotational positions, each sixty degrees (60°) apart. It has been found that a flange having fewer than six sides cannot be rotated in the assembled connector unless the diameter of bore portion 41 is increased because the diagonal of a four sided flange is too great for rotation of the flange. However, increasing the diameter of portion 41 seriously weakens the walls of the housing section 12. Further, in the tuning of the connector it has been found that six sides gives a more accurate tuning for reduction in insertion loss. The use of a flange with more than six sides is possible, and gives an even greater tuning accuracy by creating smaller increments of rotation. However, the increased accuracy is not sufficiently great to justify the increased difficulty in achieving a stable and firm seating of the flange. As the number of flange sides is increased, the periphery thereof approaches a circular configuration, which would possibly be undesirably rotatable even when seated. As a consequence, it has been found that a six sided flange is optimum for tuning non-PM type connector plugs. For the PM type fiber connections, greater precision, including incremental control of angular orientation of the polarized fiber in the ferrule is required if optimum light transmission with polarization unimpaired or altered is to be realized.

The present disclosure comprises three separate apparatuses and a tuning method for achieving optimum or near optimum polarization maintenance and transmission through the connector assembly, which comprises a connector plug and an adapter therefor.

PM Connector Plug

Figure 8:
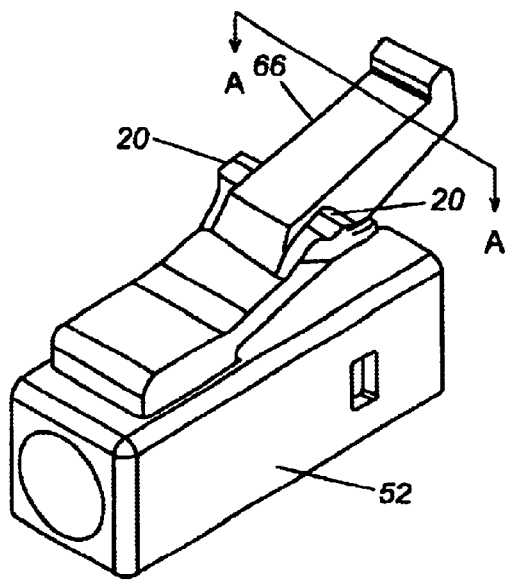
FIGS. 8, and 9 are two views of the plug housing for use with PM optical fiber.
Figure 9:
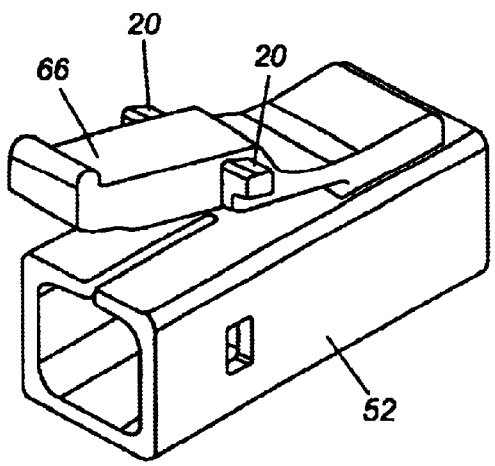
Figure 10:
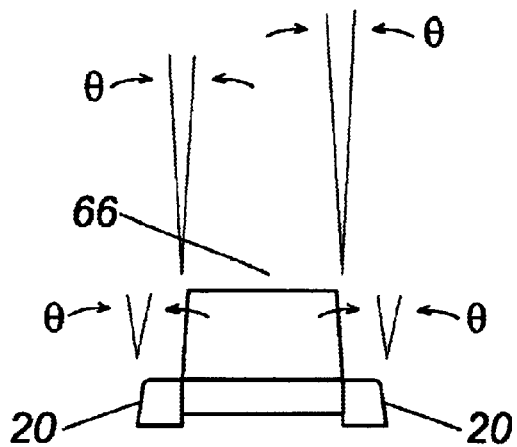
FIG. 10 is a section along the line A—A of FIG. 8.

In the foregoing, the tuning process for non-PM connections is shown and discussed. The PM connector plug, which is basically a modified LC type connector plug, is shown in cross-section in FIG. 5 and comprises a plug housing 51 which includes a front section 52 and a rear section extender cap 53, within which is contained a barrel assembly 54 having a fiber bearing ferrule 56 mounted thereto. The barrel assembly 54 has an enlarged nut, such as a hexagonal nut 57 which is a light press fit on a tubular member 58 through which the coated fiber 59 passes. Nut 57 has a sloping front surface 61 and is held in a matching seat 62, which has a sloped surface 60 for receiving surface 61, pressed into engagement by means of a coil spring 63, as shown. Seat 62 is also hexagonal so that barrel assembly 54 is prevented from rotating when seated in front portion 52. A boot 64 extends from the rear extender cap 53 in accordance with common practice. Front section 52 has a resilient latch comprising latching arm 66 and latching FIG. 6 is an exploded perspective view and FIG. 7a side elevation view of the barrel assembly 54 comprising the tubular member 58 in which the ferrule 56 is fixedly mounted. Member 58 has a bore 67 extending therethrough for receiving the coated fiber 59, and the front end 68 has first and second tuning notches 69 and 71. Nut 57 is mounted in a light press fit on the front portion 68 of tubular member 58 and butts against a stop ridge 72. By light press fit is meant a fit such that with application of a substantial rotational torque on tubular member 58 it can be rotated with respect to nut 57, yet the fit is tight enough that relative rotation between the member 58 and nut 57 will not occur under the forces, if any, likely to be encountered in use. Thus incremental rotation of the fiber containing ferrule 56, which is fixed in tubular member 58, relative to the nut 57, may be performed. As thus far described, the connector plug 51 is substantially similar to the aforementioned Lampert et al. application. In keeping with the necessity of eliminating as much play or float as possible so that subsequent polarization tuning may be maintained, connector plug 51, more particularly the plug housing, comprising front and rear sections 52 and 53, is made to be a firm fit within the connector adapter, described hereinafter, which is the subject of the co-pending application Ser. No. 10/151,130 filed concurrently herewith. In addition, as best seen in the FIGS. 8, 9 and 10, the latching arm 66 has a cross-section that is in the form of a truncated wedge, with the sides 73 and 74 thereof being at an angle θ of approximately four to eight degrees (4°–8°) to the vertical, as shown in FIG. 10, although other angles or angle ranges might be used. Latching shoulders 20 may be tapered, as shown in FIG. 10.

In FIG. 11 there is shown a second embodiment 76 of the connector plug. For simplicity, like parts to those in FIGS. 5–7 bear the same reference numerals. FIG. 12 is an exploded perspective view of a portion of the plug 76, illustrating the unique details thereof.

As can be seen in FIG. 11, tubular member 54 is made with the nut 57 integral therewith, although the arrangement of FIGS. 6 and 7 may also be used. The sloped surface 61 bears against the sloped surface 60 within front section 52, as is the case with the embodiment of FIG. 5. However, front section 52 does not have, within the bore thereof, the hexagonal seating or locating surface 62 of the embodiment of FIG. 5. Instead of the surface 62, member 53 has extending longitudinally therefrom toward the connector end of the plug 75 three separate resilient clamping arms 77, 78, and 79, the distal end of each of which ends in a clamping pad 81, as best seen in FIG. 12. Arms 77, 78, and 79 are radially positioned 120° from each other and pads 81 have flat faces for bearing against corresponding flat surfaces on nut 57 thus forming a three-jaw collet. The diametric spacing of the pads 81 is slightly less than the corresponding faces of nut 57 against which they bear, thus insuring a positive clamping action on nut 57. However, the resilience of the arms, which are preferably made of a suitable plastic, is such that nut 57 may be rotated with respect thereto upon application of sufficient torque. Thus nut 57, and consequently ferrule 56, may be rotated with respect to latching arm 66, and clamped firmly in place after such rotation. Further, as pointed out hereinbefore, where, as in the embodiment of FIGS. 6 and 7, the nut 57 is not integral with tubular member 54, incremental rotations of ferrule 56 with respect to latching arm 66 are possible. A circular ridge 82 surrounds the member 53 and rides in a corresponding groove 83 in front section 52 to permit relative rotation of the barrel assembly and three-jaw collet of FIG. 9 with respect to latching arm 66, which likewise permits incremental angular position changes of ferrule 56 with respect to latching arm 66. After the turning process, which will be discussed more fully hereinafter, ridge 82 may be cemented within groove 83 to maintain the tuned position of ferrule 56 with respect to arm 66. While the collet chuck formed by the arms 77, 78, and 79 is shown with three arms, it is to be understood that fewer arms, or more arms, may be used so long as the barrel assembly is located and firmly held in place within front portion 52.

The tapered cross-section of arm 66 in both embodiments is intended to fit within as tapered slot within the adapter, to be discussed more fully hereinafter, but can fit within a straight side slots as will inasmuch as the tapered sides of the arm 66 will engage the straight sided walls at some point, thus limiting lateral float. Thus the plug may be used in a typical LC connection as well as a PM connection.

The PM connector plug is shown and described herein.

PM Adapter

Figure 13:
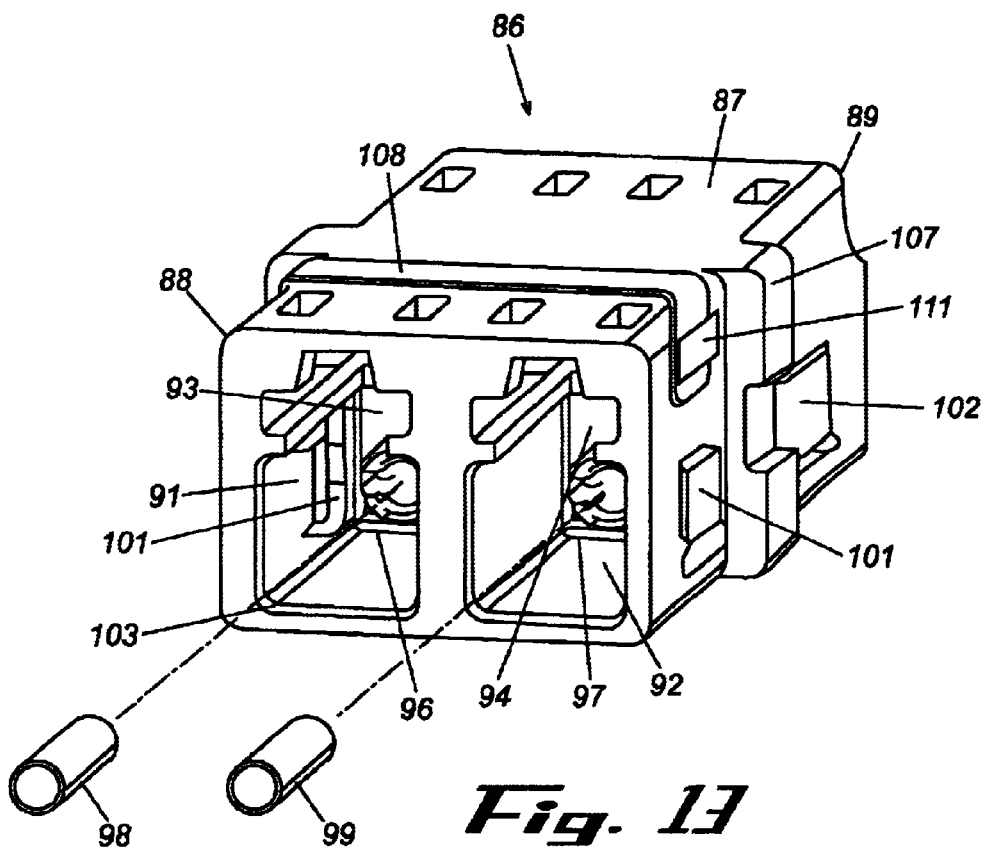
FIG. 13 is a perspective view of a connector adapter for use with the plug of FIG. 5, for example.
Figure 14:
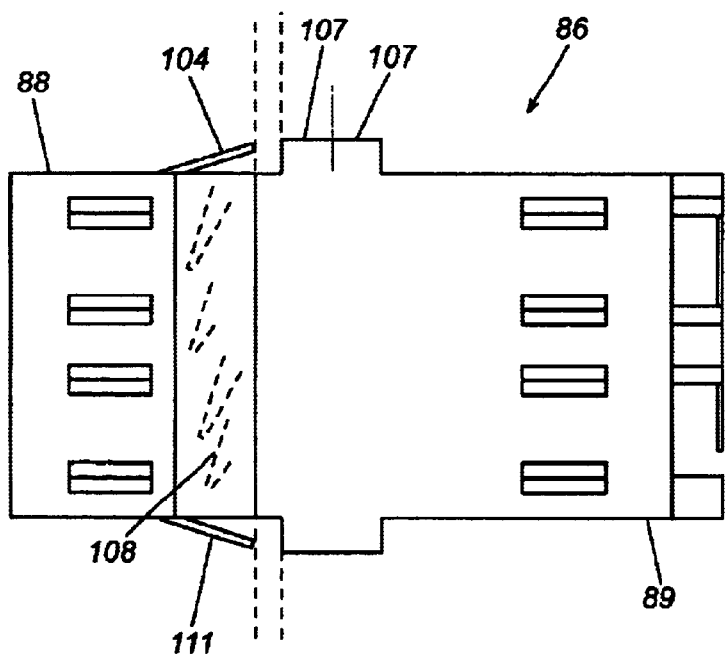
FIG. 14 is a top plan view of the adapter of FIG. 13.
Figure 15:
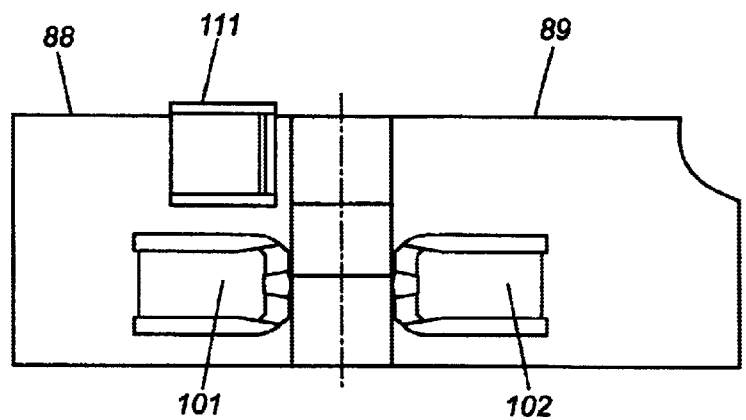
FIG. 15 is a side elevation view of the adapter of FIG. 13.
Figure 16:
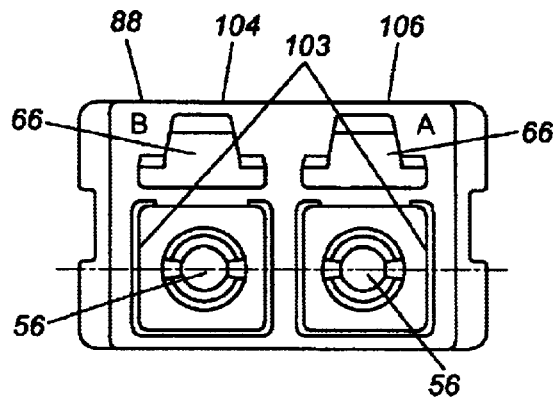
FIG. 16 is a front elevation view of the adapter of FIG. 13.

FIG. 13 is a perspective view of the PM adapter 86 for receiving the connector plug. FIGS. 14 and 15 are, respectively, a plan view and an elevation view of the adapter, and FIG. 16 is a front elevation view with connector inserted. The adapter 86 is depicted in the drawings as a duplex adapter, which is a common LC adapter form, but it is to be understood that the principles herein set forth may readily be used in a simplex or multiplex adapter.

PM adapter 86 is basically similar to the conventional LC adapter and comprises a housing 87 made up of first and second plug receiving members 88 and 89, each of which has a pair of openings 91 and 92 for receiving the connector plugs. Each opening has a transverse wall 93 and 94 from which project tubular ferrule receiving members 96 and 97 into which alignment sleeves 98 and 99 fit. Member 89 is constructed in the same way so that the alignment sleeves 98 and 99 are situated in the ferrule receiving members 96 and 97 in both members 88 and 89 so that the members 96 and 97 are aligned. As thus far described, housing 87 is the same as a conventional LC adapter housing. In order that PM connections may be realized, each member 88 and 89, which are preferably made of molded plastic, has spring biasing members 101 and 102 molded in the outer walls of openings 91 and 92, each has a pad 103 (only one of which is shown) which, when a plug is inserted into either opening 91 or 92 bears against the body thereof to produce a positive, repeatable, transverse seating of the plug. Where a simplex adapter is used, the biasing members 101 and 102 will preferably be located in the side walls opposition each other.

Further repeatable location of the PM plug is produced by first and second slots 104 and 106 for receiving the latching arm 66 of the connector plug housing 51 which has a truncated wedge shape as discussed in the foregoing. To receive and seat the latching arms, slots 104 and 106 have tapered side walls, as best seen in FIGS. 13 and 16, so that, as shown in FIG. 16, latching arms 66 fit snugly therein so that virtually any and all transverse float is eliminated.

As shown in FIGS. 13 and 14, PM adapter 86 is configured to be panel mounted. To this end, each of members 88 and 89 has a flange 107 thereon which, when the members are assembled together, forms a panel mounting flange. A metallic member 108 straddles member 88 as shown in FIG. 13 and is preferably affixed thereto. First and second spring locking members 109 and 111 in the form of cantilevered leaf springs extend from member 108 as shown in FIGS. 13 and 14 and bear against the back side (or front side) of the panel, shown in dashed lines in FIG. 14, thereby locking adapter 86 in place on the panel.

The adapter as described herein can be used as a conventional LC adapter as well as a PM adapter, and shown and as described herein forms the basis for U.S. patent application Ser. No. 10/151,130 filed concurrently herewith.

Tuning Apparatus and Method

The following discussion is directed to measuring crosstalk in a jumper cable terminated at each end by the connector plug and adapter described in the foregoing, and to establishing a reference position of the apparatus for tuning the connectors terminating a jumper cable.

Figure 17:
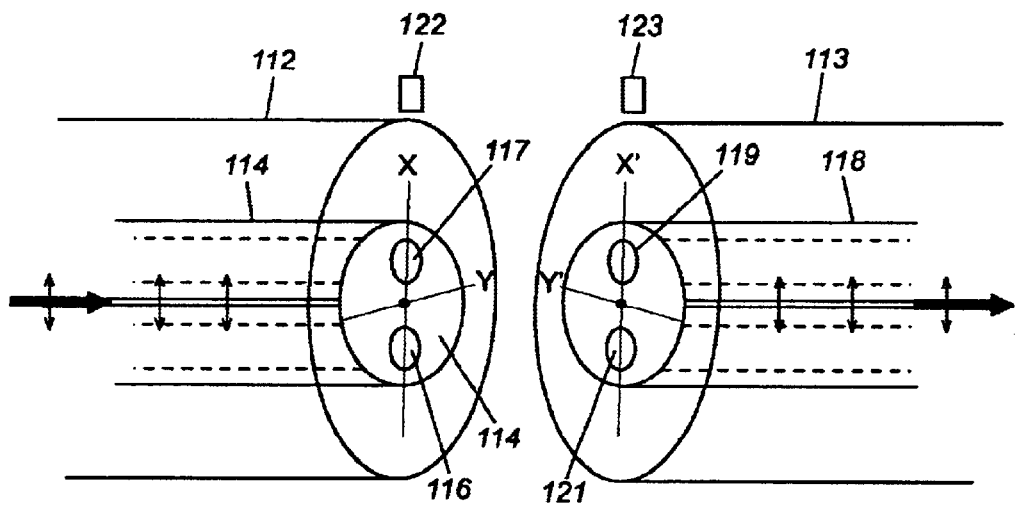
FIG. 17 is a diagrammatic representation of the relationship between two PM ferrules to be connected together.

As discussed at length in the foregoing, in order to maintain polarization and optimum light transmission at a connection, it is necessary to match the slow wave polarization of the jumper connector to the slow wave polarization of the receiving connector as closely as possible. FIG. 17 is a diagrammatic representation of the relationship between two ferrules 112 and 113 to be connected together is abutting relationship. Contained within ferrule 112 is a PM fiber 114 having first and second stress rods 116 and 117 and which propagates light in a slow axis X and a fast axis Y. Contained within ferrule 113 is a PM fiber 118 having first and second stress rods 119 and 121 and propagating light in a slow wave $X^1$ and a wave axis $Y^1$. In order that there be optimum light transmission (lowest crosstalk) between fibers 114 and 118, slow waves sectors X and $X^1$ should be parallel or (coincident) and aligned with reference points 122 and 123, which may be, for example, the latching arms of the connectors in which the ferrules 112 and 113 are contained. Unfortunately, it is seldom that such an ideal alignment is obtained. It therefore becomes necessary, for optimum performance, that the connectors terminating the jumper, for example, be tuned to at least approach the optimum in performance.

In FIG. 18 there is shown an apparatus 125 for tuning a terminated jumper cable 126 having PM connectors 127 and 128 as shown and described in the foregoing. A first assembly 129, to which connector 127 is connected comprises a light source 131 connected by a connector 130 to a coupling stage 132 having a rotatable polarizer 133 interposed between connectors 130 and 127 through which the light passes to the jumper cable 126. A second assembly 134 spaced from the first assembly 129 comprises a coupling stage 136 to which the connector 128 is connected, and a rotatable analyzer 137 through which light is directed to a power meter 138, the output of which is directed to a processor or computer 139. The processor 139 controls a rotation controller 141 for rotating polarizer 133 and analyzer 137. With the apparatus set-up 125 as shown in FIG. 18, the crosstalk of jumper cable 126 can be ascertained and the connectors 127 and 128 can be tuned by the following steps.

Step Ia) Light is launched on fiber 126 from light source 131 through the stage 132.

Step IIa) Linear polarized light is then launched into the slow axis of the fiber 126.

Figure 19:
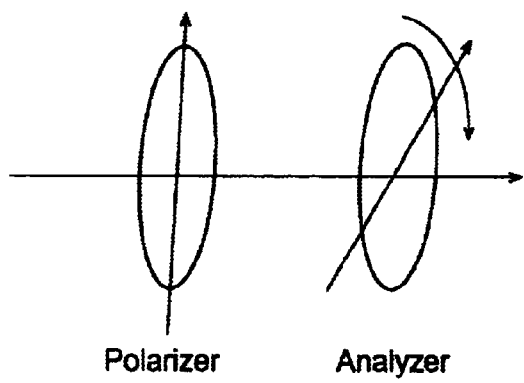
FIG. 19 is a diagram of one of the steps in tuning the optical fiber jumper.
Figure 20:
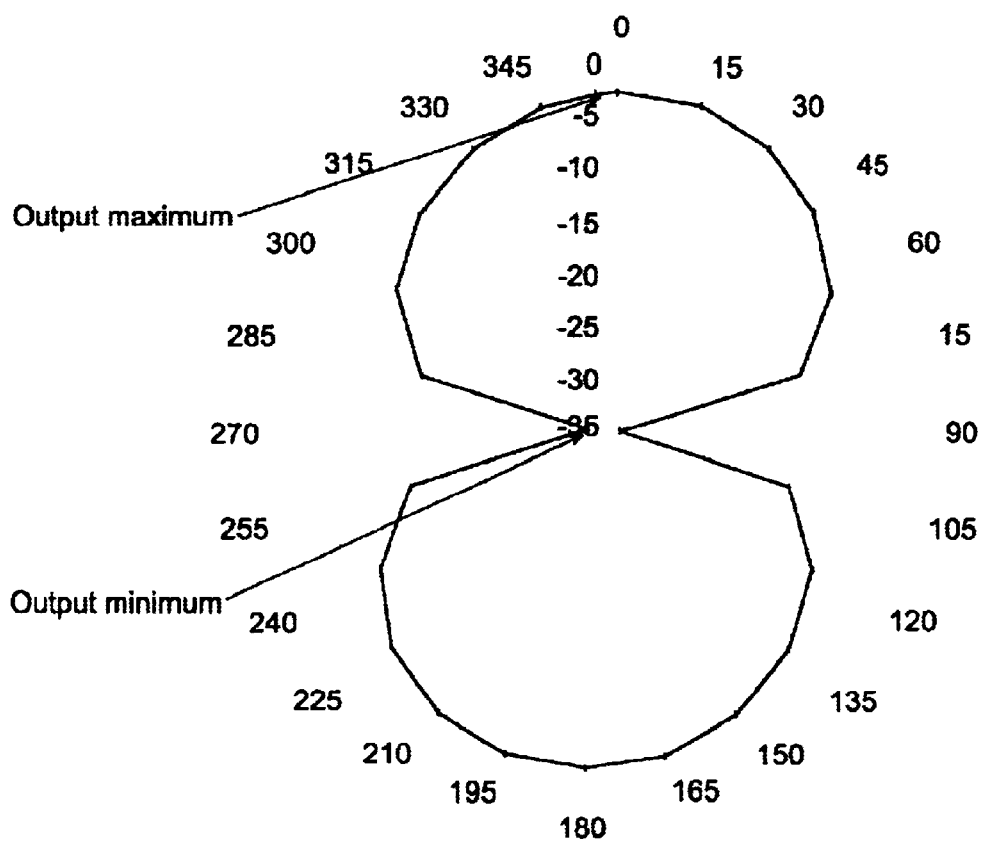
FIG. 20 is a diagram (or graph) of the variation in output power as the polarizer and analyzer are rotated.

Step IIIa) Analyzer 137 is rotated as in FIG. 19 to create a transmitted power graph by means of power meter 138. Such a graph is shown in FIG. 20 and gives an indication of transmitted power variation through a full 360° of rotation of analyzer 137. It can be seen that the output minimum is more sensitive to angular changes than is the output maximum, which is 90° of rotation therefrom, thus it is easier to pinpoint the angle at which the minimum occurs and simply add 90° to that to determine the angle at which the maximum occurs.

Step IVa) Ascertaining the crosstalk, which is a negative value, by subtracting the maximum power from the minimum power. In FIG. 20 it can be seen that the minimum power is −34:2 db at 90° and the maximum power is −3.4 db at 0°, which yields a crosstalk figure of −30.8 db.

Step Va) It is possible that the output maximum may occur at a rotational angle of the analyzer 137 that differs from cable to cable. The PM connector 128 may be tuned by rotating the ferrule, as discussed in the foregoing, and the measurements of steps I–III repeated. The crosstalk will not be changed thereby, but the angular position of the maxima and the minima, as indicated by the analyzer 137, will be. The connector can, therefore, be incrementally tuned to a setting such as 0° for the maximum, which aligns the slow wave with the connector key, the analyzer and the software of processor 139 having previously been set for a zero indication to correspond to connector key alignment with the slow wave.

Figure 21:
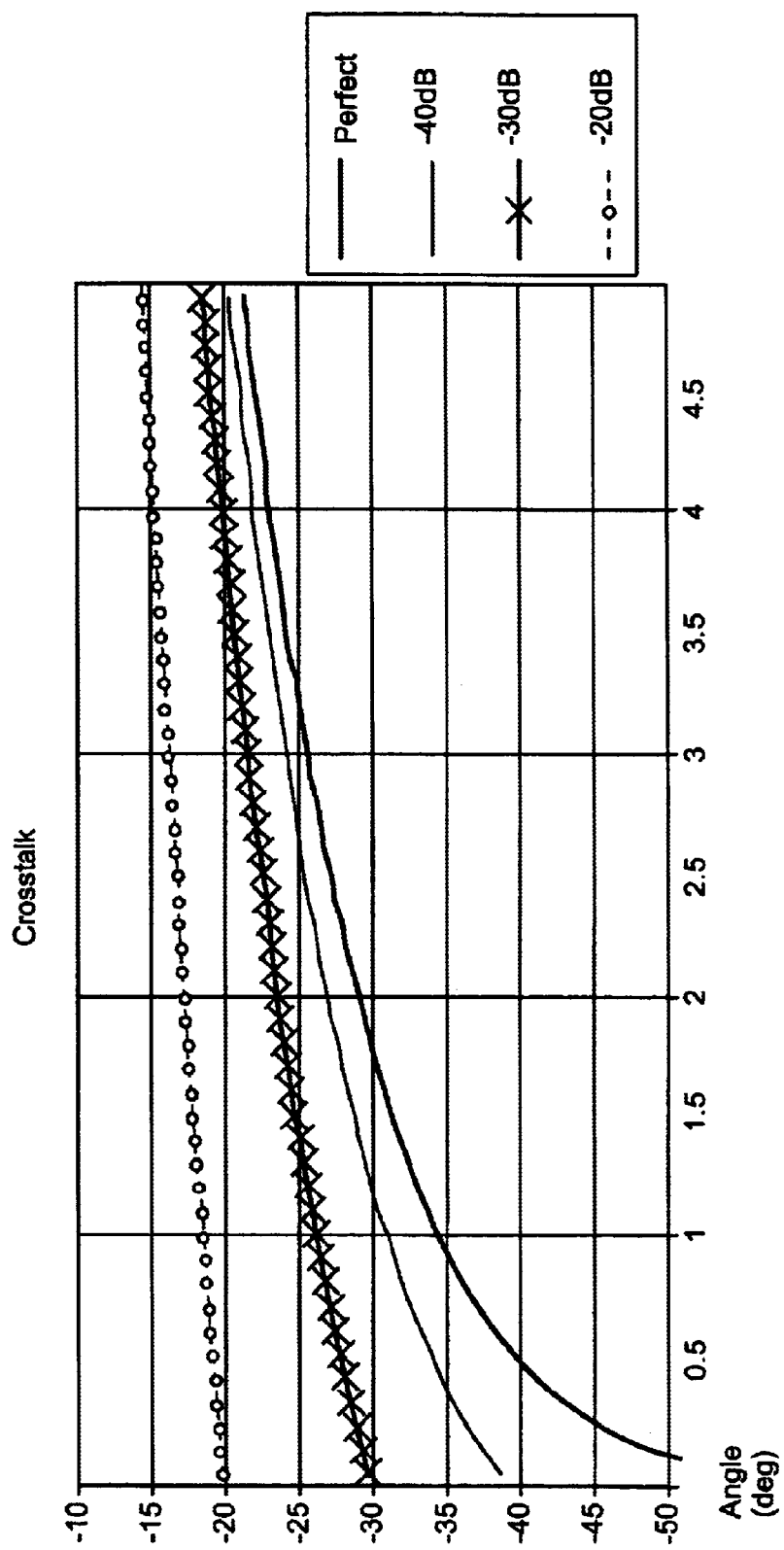
FIG. 21 is a graph showing the effect of misalignment on crosstalk.

FIG. 21 is a graph showing variations in crosstalk with misalignment, expressed in degrees of angle. The typical crosstalk of the fiber is approximately −40 dB per meter, so the characterization of a one meter jumper with no added crosstalk from the connectors would fall on the −40 dB curve. On the other hand, where the crosstalk of the connector terminated jump is −30 dB at approximately zero degrees, the crosstalk variation with angle would fall on the −30 dB curve. With a crosstalk of −20 dB at approximately zero degrees, the variation with angle follows the −20 dB curve. Misalignment of one degree (1°) can be dramatically different, depending upon how good the jumper is. The graph thus illustrates the extreme sensitivity to turning in a connectorized jumper.

In production milieu, it is desirable to establish a master position for the analyzer so that jumpers may be tuned thereto at a production rate, with the slow axis of each being aligned with the connector key. The joined PM jumpers can have the same slow axis alignment according to key position to minimize crosstalk resulting from misalignment. Once the polarization direction of the analyzer is aligned to the connector key, the tuning process can easily be performed by matching the fiber slow axis to the analyzer direction as indicated by output light power.

The second stage has a keyed receptacle for receiving the keyed connector plug thus the keys are aligned with each other. The master reference position will be that position where the analyzer zero coincides with the key of the receptacle, and hence the connector key.

Figure 22:
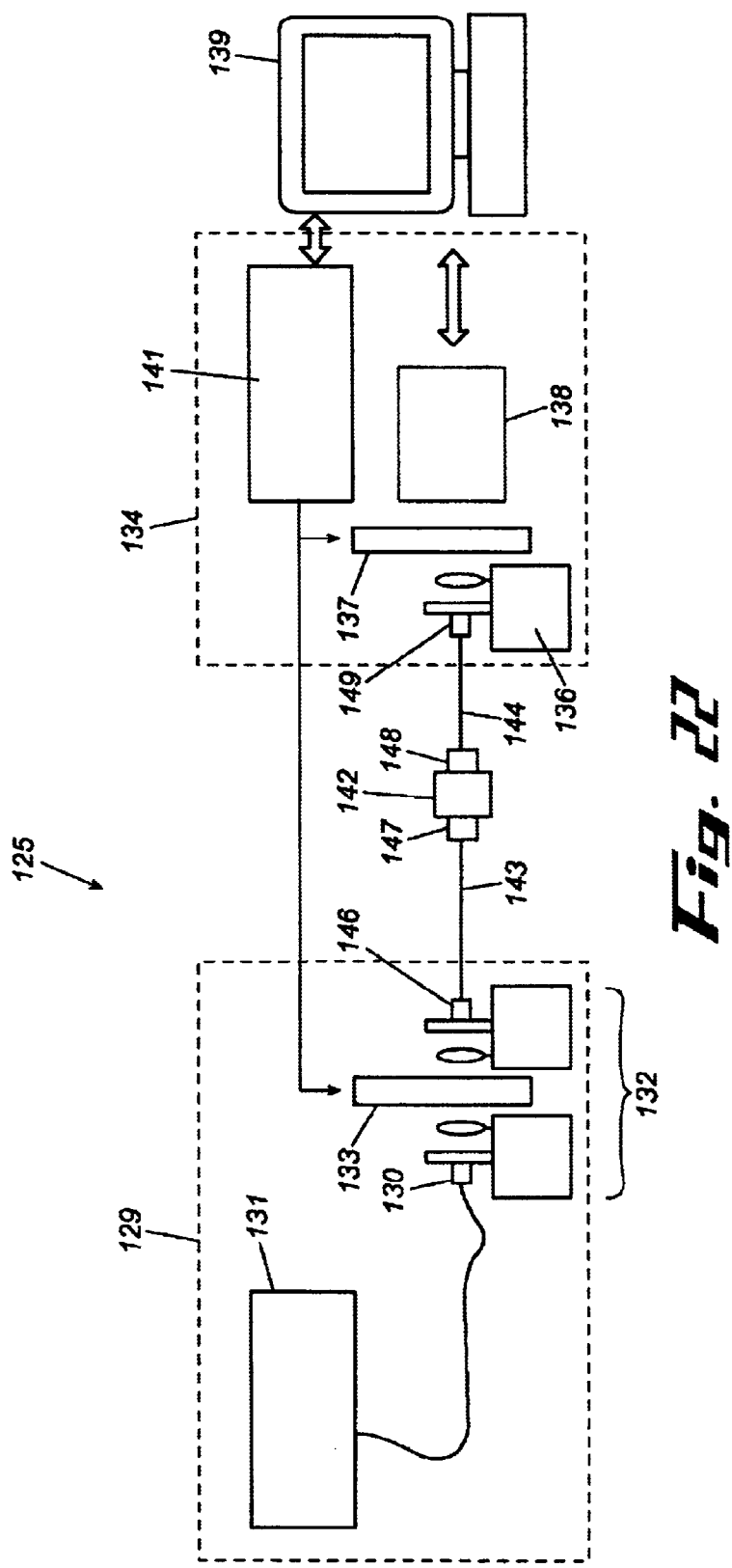
FIG. 22 is the apparatus of FIG. 18 as set up to determine the master reference position.
Figure 23:
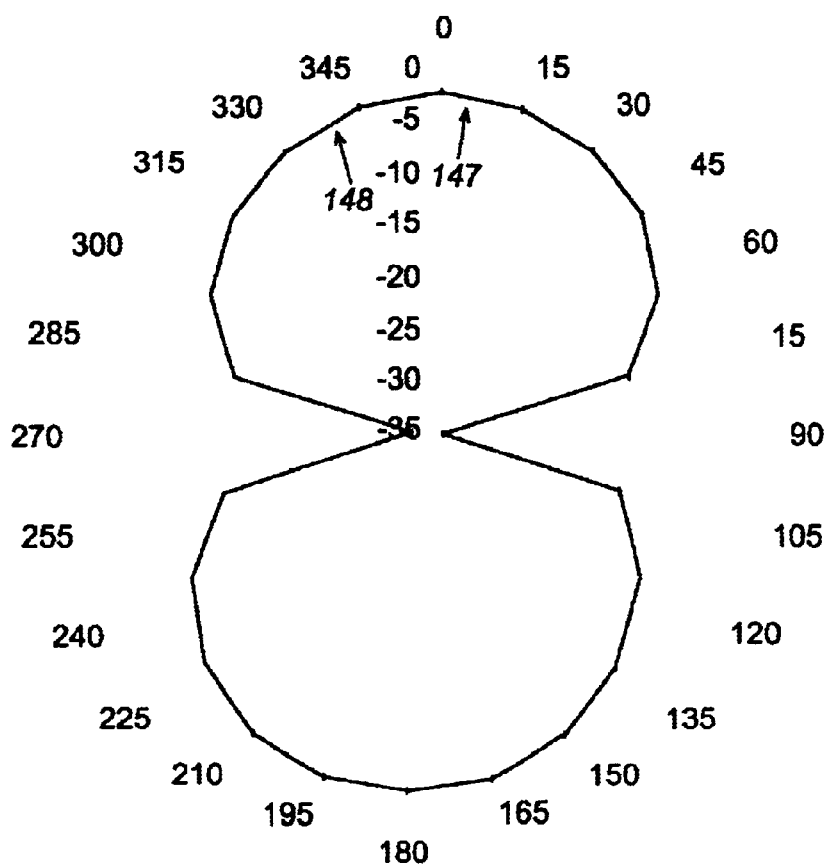
FIG. 23 is a graph resulting from the operation of the apparatus of FIG. 23.

In FIG. 22 the apparatus 125 is shown by being set up to tune the connector plugs 147 and 148 in connector adapter 142 of a pair of jumper cables 143 and 144. Cable 143 is terminated by PM connector plugs 146 and 147 of the type disclosed hereinbefore, and cable 144 is terminated by similar PM connector plugs 148 and 149. The steps in tuning the connectors are similar to preceding crosstalk measurement and tuning, and are as follows, (refer also to FIGS. 24 through 27);

Step Ib) Measure the crosstalk of the connector as in Steps Ia, IIa, and IIIa;

Step IIb) Adjust all of connectors 147 and 148 to the other for lowest crostalk;

Step IIIb) Remove adapter 142 and jumper 144 and reconnect connector plug 147 second coupling stage 136;

Step IVb) Measure the crosstalk of jumper 143 to determine the angular position of output maximum and minimum, for example, +6° for the maximum; as shown in FIG. 23;

Step Vb) Replace jumper 143 with jumper 144 and reconnect connector plug 148 to second stage 136;

Step VIb) Measure the crosstalk of jumper 144 to determine the angular position of the output maximum and minimum, for example 340° or −20°, as shown in FIG. 23;

Step VIIb) The key position will be at one-half the difference between the two angles, or −7°;

Step VIIIb) Adjust the analyzer, as discussed in the foregoing to −7° as indicated by the analyzer, which aligns the zero angle of the analyzer with the receptacle key. This is the master reference position. The sequence or order of jumpers 143 and 144 may be reversed, if desired or necessary. The connectors can now be tuned for optimum performance. In the subsequent production of connectorized fibers, particularly jumpers, it becomes a simple matter to tune the connectors by rotation of the ferrule to the key position, with the master reference position set as in the foregoing, thus eliminating the many steps involved in tuning PM connectors (or jumpers).

In practice, the foregoing method has yielded crosstalk negative values of better than −38 db. Because of the unique configuration of the PM connector plug and the PM connector adapter, when the connector plugs are tuned in accordance with the foregoing steps, the tuning is maintained in normal usage, due to the reduced float within the connectors described in the foregoing and resistance to any accidental or unintentional change of the setting of the ferrule in the connector plug.

It is to be understood that the various features of the present invention lend themselves to other types of PM optical fiber connectors, and that other modifications or adaptations might occur to workers in the art. All such variations and modifications are intended to be included herein as being within the scope of the present invention as set forth. Further, in the claims hereinafter, the corresponding structures, materials, acts, and equivalents of all means or step-plus-finction elements are intended to include any structure, material or acts for performing the functions in combination with other elements as specifically claimed.

What is claimed is:

1. An optical fiber connector plug for use in a polarization maintaining connector including a receiving member therefor comprising:

a substantially hollow plug housing having a front portion having a bore extending therethrough and a tapered seating surface formed in said bore;

a barrel assembly having a tubular portion contained within said housing and forming a passage for an optical fiber, said tubular portion having a flange member thereon beyond which extends a ferrule, said first flange member having a tapered portion dimensioned to fit on said tapered seating surface; and said housing further having a latch thereon for latching to a slot in the receiving member comprising a latching arm including a pair of shoulders extending therefrom, said latch having first and second tapered sides forming a truncated wedge shaped vertical cross-section of at least a portion of said latch, for bearing against the slot in the receiving member to minimize transverse movement of said latching arm.

2. A connector plug as claimed in claim 1 wherein the angle of the taper on the latch is from four to eight degrees (4°–8°).

3. A connector plug as claimed in claim 1 wherein the latching arm has tapered sides.

4. A connector plug as claimed in claim 1 wherein the latching shoulders have tapered sides.

5. A connector plug as claimed in claim 1 wherein said flange member has a polygonal shape.

6. A connector plug as claimed in claim 5 wherein said plug housing has a corresponding polygonal shape formed in said bore adjacent said seating surface.

7. A connector plug as claimed in claim 5 wherein said flange member is a light press fit on said tubular member.

8. A connector plug as claimed in claim 7 wherein said flange member is rotatable relative to said tubular member and said ferrule.

9. A connector plug as claimed in claim 5 wherein said flange member is affixed to said tubular member.

10. A connector plug as claimed in claim 1 wherein said plug housing has a rear portion comprising an elongated extender cap extending into said front portion and rotatable with respect thereto.

11. A connector plug as claimed in claim 1 wherein a spring member surrounds said tubular member and bears against said first flange member.

12. An optical fiber connector plug for use in a polarization maintaining connector comprising:

a substantially hollow plug housing having a front portion and a rear portion rotatable with respect to said front portion;

each of said front and rear portions having a first passageway;

a barrel assembly having a tubular portion contained within said first passageway;

said tubular portion forming a second passageway for an optical fiber;

said tubular portion having a flange member at one end thereof from which extends a ferrule;

said flange member having a hexagonal shape and having a first tapered portion extending therefrom;

said first portion of said plug housing having a second tapered portion in said first passageway dimensioned to form a seating surface for said first tapered portion;

said rear portion of said plug housing comprising a rotatable extender cap having two or more resilient clamping arms extending into said front portion of said plug housing and forming a multi-jaw collet chuck;

each of said resilient clamping arms having a distal end having a clamping pad thereon for bearing against a surface of said hexagonally shaped flange member; and said ferrule being rotated relative to said reference key on said first portion of said plug housing when said extender cap is rotated.

13. An optical fiber connector plug as claimed in claim 12 and further including a coil spring member surrounding said tubular portion of said barrel for forcing said first tapered portion on said flange member to seat in said second tapered portion in said first portion of said plug housing.

14. An optical fiber connector plug as claimed in claim 12 wherein said front portion of said plug housing has an interior circular groove in said first passageway and said extender cap has an external ridge thereon dimensioned to fit within said groove to permit rotation of said extender cap relative to said first portion.

15. An optical fiber connector plug as claimed in claim 12 wherein said front portion of said plug housing has a latching arm extending therefrom, said latching arm having first and second tapered sides forming a truncated wedge shaped cross-section of said latching arm, said latching arm forming the reference key for rotation of said ferrule.

16. An optical fiber connector plug for use in a polarization maintaining connector comprising:

a substantially hollow plug housing having a front portion having a bore extending therethrough and a tapered seating surface formed in said bore, and a rear portion comprising an elongated extender cap extending into said front portion and rotatable with respect thereto, the portion of said extender cap extending into said front portion comprising at least two elongated resilient clamping arms for clamping said flange member;

a barrel assembly having a tubular portion contained within said housing and forming a passage for an optical fiber, said tubular portion having a flange member thereon beyond which extends a ferrule, said flange member having a tapered portion dimensioned to fit on said tapered seating surface; and said housing further having a latch comprising a latching arm including a pair of shoulders extending therefrom, said latch having first and second tapered sides forming a truncated wedge shaped cross-section of at least a portion of said latch.

17. A connector plug as claimed in claim 16 wherein there are three resilient clamping arms each having a distal end forming a three jawed collet chuck.

18. A connector plug as claimed in claim 17 wherein each distal end of the three clamping arms has a clamping pad thereon.

19. A connector plug as claimed in claim 16 wherein said front portion of said plug housing has an interior circular groove therein.

20. A connector plug as claimed in claim 19 wherein said extender cap has an external circular ridge.

21. A connector plug as claimed in claim 20 wherein said circular ridge is dimensioned to fit within said circular groove to permit rotation of said extender cap relative to said front portion of said plug housing.

* * * * *